United States Patent [19]

Rebers

[11] Patent Number: 4,990,300
[45] Date of Patent: Feb. 5, 1991

[54] PROCESS FOR MIXING AND CONVEYING POLYURETHANE INTO A SHOE SOLE MOLD CAVITY

[75] Inventor: Günter Rebers, Achim, Fed. Rep. of Germany

[73] Assignee: Klockner Ferromatik Desma GmbH, Malterdingen, Fed. Rep. of Germany

[21] Appl. No.: 346,712

[22] Filed: May 3, 1989

[30] Foreign Application Priority Data

May 3, 1988 [DE] Fed. Rep. of Germany ....... 3814993

[51] Int. Cl.$^5$ .............................................. B29C 45/80
[52] U.S. Cl. ................................. 264/328.6; 264/244; 264/328.11
[58] Field of Search ................. 264/244, 328.6, 328.11; 425/145

[56] References Cited

U.S. PATENT DOCUMENTS

| 3,752,449 | 8/1973 | Schwab et al. | 366/89 |
| 3,902,850 | 9/1975 | Lehnert | 23/252 |
| 4,129,636 | 12/1978 | Boden et al. | 264/328.6 |
| 4,299,791 | 11/1981 | Aoki | 264/328.11 |
| 4,464,320 | 8/1984 | Saidla | 264/328.6 |
| 4,545,952 | 10/1985 | Lachi | 264/328.11 |
| 4,801,256 | 1/1989 | Landwehr et al. | 264/244 |
| 4,812,268 | 3/1989 | Kamiguchi et al. | 264/40.1 |

FOREIGN PATENT DOCUMENTS

| 2062008 | 4/1973 | Fed. Rep. of Germany. |
| 55-133938 | 10/1980 | Japan | 264/328.6 |
| 62-130820 | 6/1987 | Japan | 425/145 |

Primary Examiner—David A. Simmons
Assistant Examiner—Allan R. Kuhns
Attorney, Agent, or Firm—Watson, Cole, Grindle & Watson

[57] ABSTRACT

A process of mixing isocyanate and a polyol that reacts to form polyurethane used for the production of shoe soles includes the feeding of the isocyanate and the polyol into the bore of an elongated cylinder having a discharge opening at one end, the bore having a conical surface tapering toward that end, mixing the isocyanate and the polyol into a mixture reacting into the polyurethane by rotating an externally threaded worm in the bore, the worm having a shape matching the shape of the bore, and conveying the polyurethane through the opening into a shoe sole mold cavity. The worm and the cylinder in which it operates is disposed along a substantially vertical axis relative to the mold cavity, and the discharge opening is directed downwardly toward the mole cavity. At the end of each mixing and conveying step, the worm is axially shifted in a direction toward the discharge end followed by shifting the worm in an opposite direction for avoiding formation of any dribbles or drips of non-reacted mixture of the isocyanate and the polyol at the discharge end.

1 Claim, 1 Drawing Sheet

PROCESS FOR MIXING AND CONVEYING POLYURETHANE INTO A SHOE SOLE MOLD CAVITY

BACKGROUND OF THE INVENTION

This invention relates to a process for mixing isocyanate and a polyol that reacts to form polyurethane used for the production of shoe soles, the isocyanate and the polyol being fed into the bore of an elongated cylinder having the discharge opening at one end, and the bore having a conical surface tapering toward that end. The isocyanate and the polyol are mixed into a mixture reacting into polyurethane by rotating an externally threaded worm in the bore. The worm has a shape complementary to the shape of the bore. The polyurethane is conveyed through the discharge opening into a shoe sole mold cavity by axially shifting the worm in one direction toward the discharge end after the mixing step.

German patent No. 2,062,008 discloses a mixing device for the mixing of isocyanate and a polyol into a mixture reacting into polyurethane, the device including a mixing worm that has a conical taper at a section adjacent the discharge end of a cylinder in which the worm operates. The bore of the cylinder has a shape complementary to the worm, and the worm is capable of axially shifting toward the discharge end of the cylinder for injecting the polyurethane into a shoe sole mold cavity.

This type of mixing device is used, for example, on shoe soling machines in which soles are molded on to shoe uppers, the soles comprising an outer sole of wear resistant polyurethane and an elastic inner sole of polyurethane. The mold machines are mounted on a circular turntable to define a plurality of spaced apart molding stations for the molding of the outer and inner soles on to the shoe uppers. The molding machine is located at each stations on the turntable, the stations being stopped during incremental movement and locked when stopped relative to two mixing and injection devices. These devices are located adjacent the periphery of the turntable and are movable in a radial direction toward the turntable. The molding machine at each station has two lateral molding elements which, in a mold closed position, define an opening and sprue channels. A vertically movable last turning body is mounted on the apparatus above the lateral mold elements, the body having a counter stamp and a shoe last for supporting the shoe uppers. A vertically adjustable bottom stamp is located below the lateral mold elements. The bottom stamp, the lateral mold elements in their mold closing position and the counter stamp together define a mold cavity into which the mixture reacting into the outer sole is introduced. The bottom stamp which contains the molded outer sole, the lateral mold elements in a mold closed position, and the shoe last which supports the shoe upper define a mold cavity for molding the inner sole as the mixture reacting into the inner sole is introduced into the mold cavity, which, in the course of the reaction bonds to the outer sole and to the shoe upper.

During the molding of the outer sole, the closed lateral mold elements, the bottom stamp and the counter stamp define a mold cavity the volume of which is somewhat larger than the volume of the outer sole of the reacted mixture, whereby the two lateral mold elements in their closed position surround a pouring bore through which the mixture for the outer sole is fed into the defined mold cavity. Then, the mold cavity is reduced to the volume of the finished outer sole, and the bottom stamp simultaneously closes off the feed bore. After sufficient solidification of the material for the outer sole, the sides of the mold are opened, the last turning body is pivoted and moved such that the last supported shoe upper is disposed at the reclosed lateral mold elements so that the lasted shaft, the closed lateral mold elements and the outer sole and the bottom stamp form a mold cavity for molding the intermediate sole, whereby the lateral mold elements surround a second feed bore through which the mixture reacting and forming the inner sole is fed in.

The aforedescribed molding operation is disclosed in U.S. Pat. No. 4,801,256, the entire disclosure of which is specifically incorporated herein by reference.

During mixing of the isocyanate and the polyol chemical reactions start so that a portion of the mixture precipitates on to the inner wall of the cylinder in which the worm operates and forms a film of polyurethane which, over time, becomes thicker. This results in reduction of the gap between the cylinder wall and the worm such that the gap required for mixing becomes closed. For this reason it is necessary to at least partially reduce the film to maintain the gap at a predetermined minimum gap width. When the film of reacted polyurethane forming on the cylinder bore wall has reduced the spacing between the cylinder bore and the worm to practically zero, the polyurethane film is removed and expelled outwardly of the bore by an axial shift of the worm carried out during the interval while the device is out of contact with the feed bore of the molds. The feed of isocyanate and polyol takes place through corresponding valves in measured amounts during the individual mixing intervals.

Although such a mixing and injection device disclosed in German patent No. 2,062,008 is capable of maintaining the minimum gap width during operation, problems arise in that the non-reacted mixture tends to dribble and drip from the discharge end of the cylinder during the material conveying operation. This is particularly disadvantageous when molds are used which are filled on the mold machine by a pouring process of the mixing device with given amounts of the component mixture.

SUMMARY OF THE INVENTION

It is therefore an object of the present invention to provide a process for mixing and injecting polyurethane into a shoe sole mold cavity employing a worm operated device as aforedescribed but avoiding the formation of any dribbles or drips of non-reacted mixture of the isocyanate and the polyol at the discharge end of the cylinder during the material conveying operation.

This objective is achieved according to the invention by disposing the worm and its cylinder along a substantially vertical axis relative to the mold cavity and by downwardly directing the discharge opening of the cylinder toward the mold cavity. And, the worm is axially shifted for a short interval at least once in the direction toward the discharge end and in a reverse direction back to its working position at the end of each mixing and conveying operation.

DETAILED DESCRIPTION OF THE INVENTION

Figure 1:
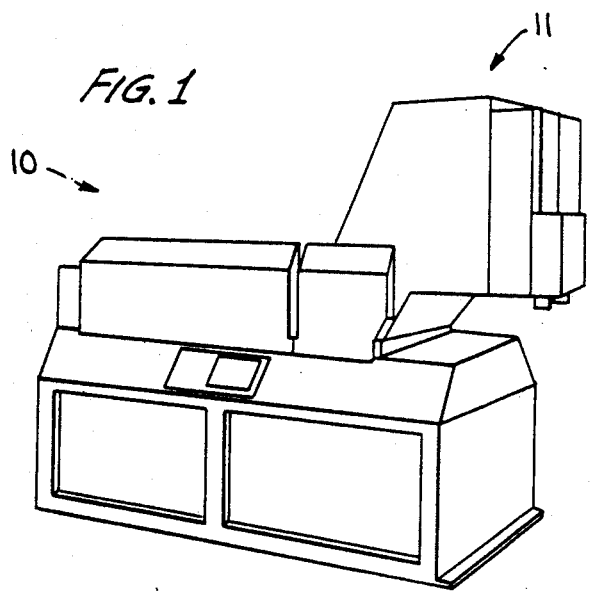
FIG. 1 is a perspective view of an apparatus which includes a vertically disposed and downwardly directed mixing/conveying device according to the invention.

An apparatus 10 is shown in FIG. 1 incorporating a device 11 which operates in accordance with the invention for the production of outer and/or inner shoe soles molded on to a last supported shoe upper (not shown). The device includes a cylindrical housing which may be of interconnected parts 12 and 13 together forming an elongated bore 14 having a discharge opening 15 at one end 16. The cylinder bore has a conical section 17 adjacent end 16 and a cylindrical section 18 remote from end 16. The cylinder has inlet openings 19 and 21 opening into bore 14, through which the isocyanate and a polyol are respectively fed into the cylinder bore via suitable nozzles, not shown.

An externally threaded worm 22 is located within cylinder bore 14 and has a shape matching the cylindrical and conical sections thereof. Suitable rotation means 23 is connected to a flange 24 at the inner end of the worm for rotating the worm about its central axis in the direction of the curved arrow. And, suitable means 25 is connected to flange 24 for axially shifting the worm along its central axis in the direction of the double arrows shown.

Figure 2:
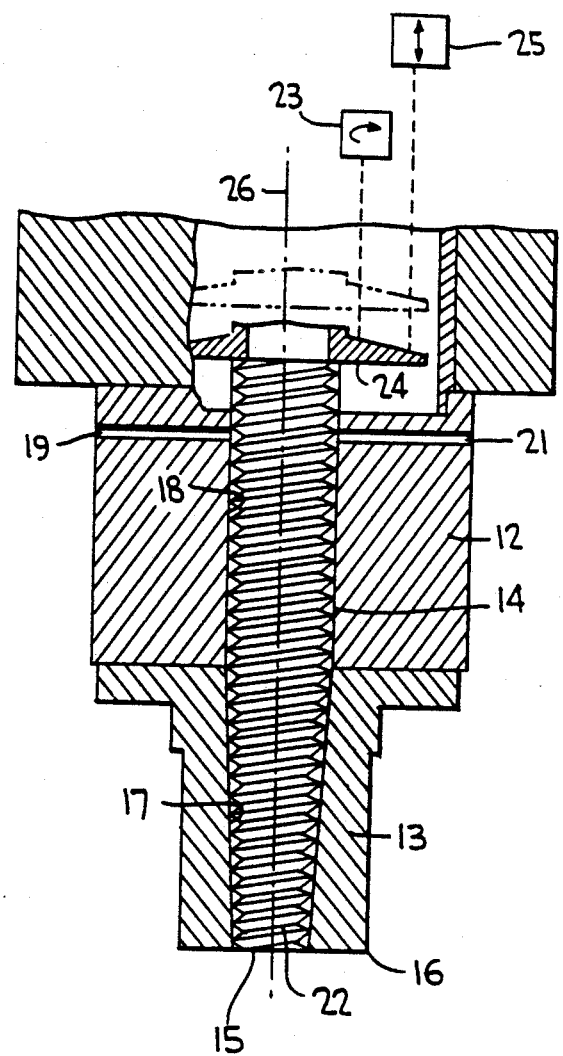
FIG. 2 is an enlarged vertical sectional view of the device of FIG. 1.
Figure 3:
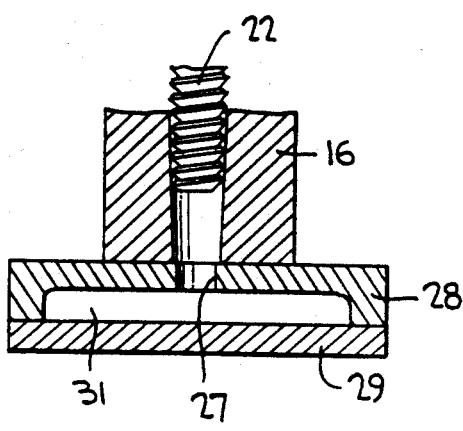
FIG. 3 is a sectional view of the tip end of the FIG. 2 device, at a reduced scale, relative to a shoe sole mold cavity inlet feed bore.

In operation, the isocyanate and the polyol are mixed into a mixture reacting into polyurethane by rotating worm 22 in bore 14 while the worm is in its working position shown in the phantom outline in FIG. 2. In this position the worm and its bore are permanently mounted on machine 10 along a substantially vertical axis 26 which may be the axis of rotation of the worm. And, discharge opening 15 is downwardly directed toward an infeed bore 27 of an upper mold half 28 which cooperates with a lower mold half 29 to define a mold cavity 31 of an inner or outer shoe sole mold.

After the mixing step means 25 is operated for axially shifting the worm to its solid outline position of FIG. 2 for a short interval at least once toward discharge end 16, and back to its phantom outline working position. This is carried out after each mixing and conveying step for avoiding the formation of any dribbles or drips of non-reacted mixture of the isocyanate and the polyol at the discharge end.

It should be noted that although the worm and the cylinder in which it operates are disposed along a substantially vertical axis 26, that axis may have a slight deviation from vertical without departing from the invention, so long as its discharge opening 15 is downwardly directed.

What is claimed is:

1. A process for mixing and conveying polyurethane into a shoe mold cavity, comprising the steps of mixing isocyanate and a polyol that reacts to form polyurethane used for the production of shoe soles, comprising the steps of feeding the isocyanate and the polyol into the bore of an elongated cylinder having a discharge opening at one end, the bore having a conical surface tapering toward said end, mixing the isocyanate and the polyol into a mixture reacting into polyurethane by rotating an externally threaded worm in said bore at an initial location, said worm having a shape matching the shape of said bore, conveying the polyurethane through said opening into a shoe sole mold cavity, and after the mixing and conveying steps axially shifting said worm first in one direction toward said one end followed by axially shifting said worm in a direction opposite said one direction away from said one end to the initial position so that the worm is axially shifted at least once for a short interval, the rotating and shifting steps being carried out while disposing the worm and the cylinder along a substantially vertical axis relative to the mold cavity, and downwardly directing the discharge opening toward the mold cavity, the shifting steps preventing formation of any dribbles or drips of the mixture of the isocyanate and the polyol at said discharge end.

* * * * *